(12) United States Patent
Chang et al.

(10) Patent No.: US 11,455,019 B2
(45) Date of Patent: Sep. 27, 2022

(54) DOCKING SYSTEM HAVING ELASTIC RAIL PORTIONS

(71) Applicant: Quanta Computer Inc., Taoyuan (TW)

(72) Inventors: Chun Chang, Taoyuan (TW);
Chia-Chun Chen, Taoyuan (TW);
Ta-Wei Chen, Taoyuan (TW);
Zhao-Hong Chen, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 146 days.

(21) Appl. No.: 16/947,842

(22) Filed: Aug. 19, 2020

(65) Prior Publication Data
US 2022/0057849 A1    Feb. 24, 2022

(51) Int. Cl.
*G06F 1/18*   (2006.01)
*H01R 13/631*  (2006.01)
*H01R 43/26*  (2006.01)

(52) U.S. Cl.
CPC .......... *G06F 1/187* (2013.01); *H01R 13/631* (2013.01); *H01R 43/26* (2013.01)

(58) Field of Classification Search
CPC .......... G06F 1/187; G06F 1/184; G06F 1/183; H01R 13/631; H01R 43/26; H01R 12/7005; H01R 12/722; H01R 13/24; H01R 13/2442; H01R 4/4809; H05K 7/1418; H05K 7/1417; H05K 7/1405; H05K 9/0016; H05K 7/1404; H05K 7/1427; H05K 3/301; H05K 5/0013; H05K 5/0026; H05K 7/1409; H05K 7/1411; H05K 7/142; G11B 33/127
See application file for complete search history.

(56) References Cited

U.S. PATENT DOCUMENTS

| | | | | |
|---|---|---|---|---|
| 3,231,785 A | * | 1/1966 | Calabro | H05K 7/1418 361/689 |
| 3,829,741 A | * | 8/1974 | Athey | H05K 3/366 361/801 |
| 4,019,099 A | * | 4/1977 | Calabro | H05K 7/1418 361/756 |
| 4,022,326 A | * | 5/1977 | Marconi | H05K 7/1418 361/756 |
| 4,096,547 A | * | 6/1978 | Calabro | H05K 7/20545 361/708 |

(Continued)

*Primary Examiner* — Michael A Matey
(74) *Attorney, Agent, or Firm* — Nixon Peabody LLP (57) ABSTRACT

A docking system for facilitating a connection of an electronics module to a mating connector comprises first and second rails. Each rail has an elongated guide slot for receiving a corresponding guide portion of the electronics module during sliding movement of the electronics module toward the mating connector. A first elastic structure is located on the first rail. The first elastic structure has a first engagement portion extending into the elongated guide slot of the first rail. A second elastic structure is located on the second rail. The second elastic structure has a second engagement portion extending into the elongated guide slot of the second rail. The first engagement portion and the second engagement portion are configured to engage the guide portions of the electronics module and to resist movement of the guide portions in a direction generally perpendicular to the sliding movement of the electronics module.

16 Claims, 5 Drawing Sheets

(56) References Cited

U.S. PATENT DOCUMENTS

| | | | | |
|---|---|---|---|---|
| 4,214,292 A * | 7/1980 | Johnson | H05K 7/20545 | 361/802 |
| 4,534,472 A * | 8/1985 | Hanseler | H05K 7/1418 | 361/802 |
| 4,779,744 A * | 10/1988 | Shely | H05K 7/1418 | 361/802 |
| 4,780,570 A * | 10/1988 | Chuck | H05K 9/0016 | 361/818 |
| 5,055,061 A * | 10/1991 | Lichtenwalter | H01R 12/7005 | 361/802 |
| 5,187,648 A * | 2/1993 | Ito | H05K 7/1418 | 361/756 |
| 5,467,254 A * | 11/1995 | Brusati | H05K 9/0039 | 174/355 |
| 5,533,631 A * | 7/1996 | Marchetti | H05K 7/1418 | 361/756 |
| 5,552,946 A * | 9/1996 | Bicknese | G11B 33/124 | 360/99.19 |
| 5,806,949 A * | 9/1998 | Johnson | G06F 1/184 | 312/334.7 |
| 6,058,016 A * | 5/2000 | Anderson | H05K 7/1411 | |
| 6,469,889 B1 * | 10/2002 | Gan | G06F 1/187 | |
| 6,580,607 B1 * | 6/2003 | Feldmeyer | G06F 1/184 | |
| 6,735,093 B2 * | 5/2004 | Mu-Tsai | G06F 1/183 | 361/802 |
| 7,969,724 B2 * | 6/2011 | Chen | G06F 1/187 | 361/679.33 |
| 8,064,210 B2 * | 11/2011 | Ellis | H05K 7/1418 | 361/756 |
| 8,077,471 B2 * | 12/2011 | Luettermann | H05K 7/1418 | 361/756 |
| 9,865,939 B2 * | 1/2018 | Luukkainen | H05K 9/0064 | |
| 2009/0141457 A1 * | 6/2009 | Fujikawa | G11B 33/12 | 361/727 |
| 2019/0200473 A1 * | 6/2019 | Miura | H05K 5/0217 | |
| 2019/0200474 A1 * | 6/2019 | Miura | H05K 5/0247 | |
| 2019/0313544 A1 * | 10/2019 | Miura | H05K 7/1427 | |

* cited by examiner

DOCKING SYSTEM HAVING ELASTIC RAIL PORTIONS

FIELD OF THE INVENTION

The present invention relates generally to a docking system for an electronics module (e.g., a printed circuit board ("PCB") module), and more specifically, to elastic portions within the rails that limit the movement of the electronics module to provide for a more accurate alignment between the connectors.

BACKGROUND OF THE INVENTION

Electronics modules, such as PCB modules, are integrated into larger electronic systems through a fixed connector associated with the electronic system. The electronics module has its own connector that mechanically and electrically mates with the system's connector. The electronics module is often docked into its operating position within the system by a sliding movement that causes the mating of the connectors. The sliding movement required for docking is often facilitated by a pair of rails in the system that assists in guiding the movement of the electronics module.

The connectors include sensitive electrical components that can be weakened or damaged if proper alignment is not achieved as the connectors are mated. The sliding movement used for docking requires accurate alignment of the parts of the connector to avoid damage. Further, inaccurate alignment during the sliding movement may also create mechanical tolerance problems in the overall assembly.

Once the connectors of the electronics module and system are properly mated, the connectors can still be damaged from shock or vibration during operation or transportation. Any relative movement between the first connector and the second connector can also result in damaged components or malfunctioning of the overall system.

The present disclosure is directed to improved rails for the docking system that, among other benefits, provide for easy and more accurate docking, decrease the risk of damage during installation of the electronics module and during shock/vibration, and assist in avoiding tolerance-related problems.

SUMMARY OF THE INVENTION

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings and each claim.

According to one aspect of the present disclosure, a docking system is directed to facilitating a connection of an electronics module to a mating connector. The docking system includes first and second rails that are separated from and oppose each other. Each of the first and second rails has an elongated guide slot for receiving a corresponding guide portion of the electronics module. The guide portion is received in the guide slot during sliding movement of the electronics module toward the mating connector. A first elastic structure is located on the first rail. The first elastic structure has a first engagement portion extending into the elongated guide slot of the first rail. A second elastic structure is located on the second rail. The second elastic structure has a second engagement portion extending into the elongated guide slot of the second rail. The first engagement portion of the first elastic structure and the second engagement portion of the second elastic structure are configured to engage the guide portions of the electronics module. The first engagement portion and the second engagement portion are further configured to resist movement of the guide portions in a direction generally perpendicular to the sliding movement of the electronics module.

According to a configuration of the above implementation, each of the elongated guide slots has an insertion end at which the electronics module is to be inserted and a terminal end adjacent to the mating connector. Each of the first and second elastic structures is located along the elongated slots at a middle region between the insertion end and the terminal end.

According to another configuration of the above implementation, each of the first and second elastic structures includes a curved middle region between two fixed ends. The curved middle region is elastically moveable. The first engagement portion of the first elastic structure and the second engagement portion of the second elastic structure are located within the curved middle regions.

According to a further configuration of the above implementation, each of the elongated guide slots of the first and second rails is defined by two opposing walls and a connecting wall between the two opposing walls. The two opposing walls and the connecting wall form a U-shape. The first elastic structure extends into an opening of one of the two opposing walls of the first rail. The second elastic structure extends into an opening of one of the two opposing walls of the second rail.

In a further aspect of the above implementation, the first engagement portion of the first elastic structure exerts a force on the guide portion of the electronics module to urge the guide portion against the other one of the two opposing walls of the first rail.

In another aspect of the above implementation, the first elastic structure is integrally formed from the material of the first rail. The second elastic structure is integrally formed from the material of the second rail.

According to another configuration of the above implementation, the first and second rails include fastening regions for permitting the rails to be fixedly mounted to other structures. As such, the distance between the first and second rails is approximately the width of the electronics module.

According to yet another configuration of the above implementation, the height of the elongated guide slots in regions outside the first and second first elastic structures is greater than the height of the guide portions of the electronics module. The first and second elastic structures extend into the elongated guide slots to reduce the height of the elongated guide slots at the first and second elastic structures to being less than the height of the guide portions.

In another aspect of the above implementation, the first engagement portion of the first elastic structure and the second engagement portion of the second elastic structure are configured to engage the guide portions of the electronics module during insertion and during operation of the electronics module.

In a further aspect of the above implementation, the first and second elastic structures transition from a first shape to a second shape in response to the first and second engagement portions engaging the guide portions of the electronics module.

In yet another aspect of the above implementation, the first and second elastic structures transition from the second shape to the first shape in response to the electronics module being removed from the first and second rails.

According to yet another configuration of the above implementation, the first engagement portion and the second engagement portion include curved surfaces that extend, respectively, into the first and second elongated guide slots.

According to yet another configuration of the above implementation, the electronics module is at least one of an Open Compute Project (OCP) module and a HDD storage module.

According to yet a further configuration of the above implementation, the first and second elongated guide slots receive laterally extending flanges of the electronics module, the laterally extending flanges being the guide portions.

Another aspect of the present disclosure includes a method of connecting an electronics module to a mating connector. The electronics module including first and second guide portions. The method includes inserting the first guide portion of the electronics module into a first elongated guide slot associated with a first rail, and inserting the second guide portion of the electronics module into a second elongated guide slot associated with a second rail. While the first guide portion of the electronics module is within the first elongated guide slot and the second guide portion of the electronics module is within the second elongated guide slot, the method further involves moving the electronics module toward the mating connector. While the electronics module is moving toward the mating connector, the method also includes limiting movement of the electronics module in a direction generally perpendicular to the movement toward the mating connector by engagement of at least one of the first and second guide portions within an elastic structure associated with the first or second rails.

According to another aspect of the above implementation, limiting movement of the electronics module includes engaging the first and second guide portions with first and second elastic structures. The first elastic structure is associated with the first rail and the second elastic structure is associated with the second rail.

According to a further aspect of the above implementation, the elastic structure extends into the first elongated slot associated with the first rail.

According to yet a further aspect of the above implementation, limiting movement of the electronics module includes urging, by use of the elastic structure, the first guide portion against a wall defining the first elongated slot.

In another aspect of the above implementation, the elastic structure transitions from a first shape to a second shape during the urging.

In another aspect of the above implementation, the method further includes, after the limiting, forming a mechanical and electrical connection between a module connector on the electronics module and the mating connector.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims. Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

The disclosure, and its advantages and drawings, will be better understood from the following description of exemplary embodiments together with reference to the accompanying drawings. These drawings depict only exemplary embodiments, and are therefore not to be considered as limitations on the scope of the various embodiments or claims.

While the invention is susceptible to various modifications and alternative forms, specific implementations have been shown by way of example in the drawings and will be described in further detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

Various embodiments are described with reference to the attached figures, where like reference numerals are used throughout the figures to designate similar or equivalent elements. The figures are not drawn to scale and are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details, or with other methods. In other instances, well-known structures or operations are not shown in detail to avoid obscuring the invention. The various embodiments are not limited by the illustrated ordering of acts or events, as some acts may occur in different orders and/or concurrently with other acts or events. Furthermore, not all illustrated acts or events are required to implement a methodology in accordance with the present invention.

Elements and limitations that are disclosed, for example, in the Abstract, Summary, and Detailed Description sections, but not explicitly set forth in the claims, should not be incorporated into the claims, singly, or collectively, by implication, inference, or otherwise. For purposes of the present detailed description, unless specifically disclaimed, the singular includes the plural and vice versa. The word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

Figure 1A:
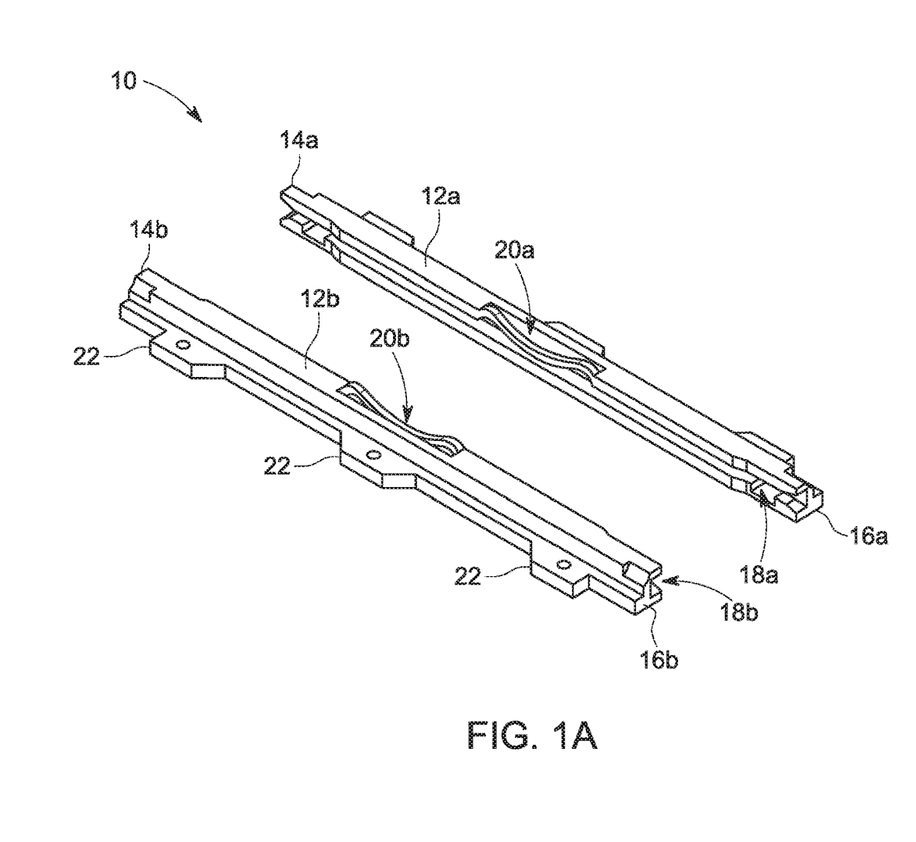
FIG. 1A is a perspective view of a pair of rails that form part of a docking system for an electronics module.

Referring to FIG. 1A, a docking system 10 includes a pair of rails 12a, 12b that receive an electronics module (e.g., a PCB module, an Open Compute Project (OCP) card, a storage module, etc.) within an enclosure for an electronic system, such as a server or a computer. The first rail 12a includes a terminal end 14a and an insertion end 16a. An elongated guide slot 18a is located between the terminal end 14a and the insertion end 16a. The elongated guide slot 18a is defined by multiple walls of the first rail 12a. In one preferred embodiment, the elongated guide slot 18a is defined by three walls forming a generally U-shape structure within the first rail 12a. Likewise, the second rail 12b includes a terminal end 14b, an insertion end 16b, and a similar elongated guide slot 18b.

The first and second rails 12a, 12b include corresponding elastic structures 20a, 20b, which are located at middle regions of the rails 12a, 12b. The elastic structures 20a, 20b facilitate the proper alignment and sliding movement of the electronics module, as will be described in more detail in FIGS. 2-4 below. Although a single elastic structure 20a, 20b is shown for each rail 12a, 12b, the present invention contemplates multiple elastic structures for each rail 12a, 12b.

Figure 1B:
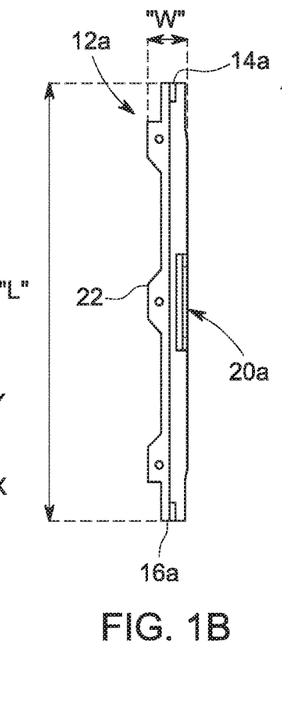
FIG. 1B is a top view of one of rails in FIG. 1A.
Figure 1C:
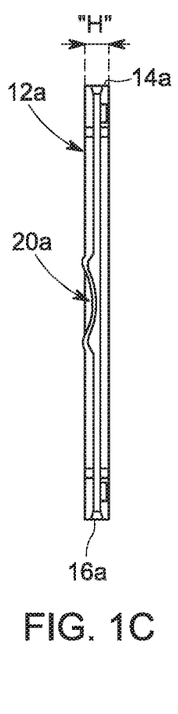
FIG. 1C is a side view of one of rails in FIG. 1A.

FIGS. 1B and 1C illustrate the first rail 12a from a top view and a side view, respectively. In one embodiment, the first rail 12a has a length "L" that is generally between about 100 mm and 200 mm. The width "W" of the first rail 12a is generally between about 5 mm and 20 mm. The height "H" of the first rail is generally between about 5 mm and 30 mm. In the illustrated embodiment, the first rail 12a has a length "L" of about 115 mm, a width "W" of about 10 mm, and a height "H" of about 6 mm. In most systems, the second rail 12b will have similar dimensions, although the present invention contemplates that the second rail 12b may be different from the first rail 12a in some instances.

Each of the rails 12a, 12b also includes a plurality of mounting structures 22 along their lengths, as specifically illustrated in FIGS. 1A-1C with respect to the second rail 12b. The mounting structures 22 allow the rails 12a, 12b to be fixedly mounted to other structures within the enclosure of the electronic system (e.g., within the server or computer). In the illustrated embodiment, the mounting structures 22 are platforms with openings for receiving fasteners. In other embodiments, the mounting structures 22 may include other types of male or female fastening components, brackets, or latches. The mounting structures 22 permit the rails 12a, 12b to be held at a fixed distance from each other that corresponds to the width of the mating electronics module.

Figure 2:
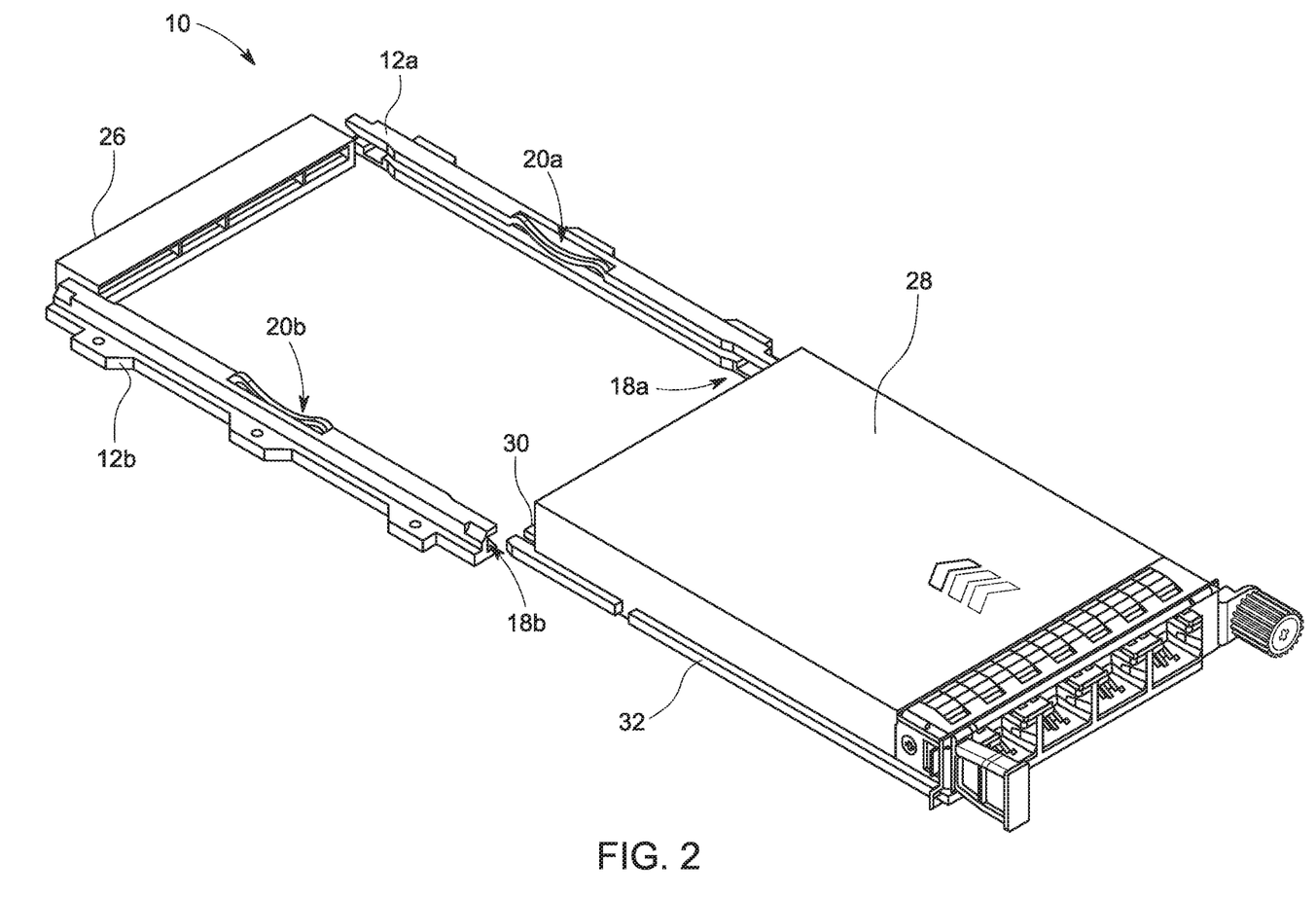
FIG. 2 illustrates the pair of rails of FIG. 1, a system connector between the rails, and an electronics module that is to be inserted into the pair of rails.

FIG. 2 illustrates the docking system 10 that includes the pair of rails 12a, 12b and a system connector 26 located between the pair of rails 12a, 12b. An electronics module 28 is to be inserted into the pair of rails 12a, 12b. A module connector 30 at the end of the electronics module 28 is for electrically and mechanically mating with the system connector 26 associated with the docking system 10.

To facilitate the movement toward the system connector 26, the electronics module 28 includes a pair of guide portions 32 (only one shown in FIG. 2) that slide within the elongated guide slots 18a, 18b. As shown, the guide portions 32 are flanges extending outwardly away from the sides of the electronics module 28. The guide portions 32 can be structures that are solely used for this guiding function, or parts of other components within the electronics module 28 (e.g., overhanging portions of a circuit board).

Figure 3A:
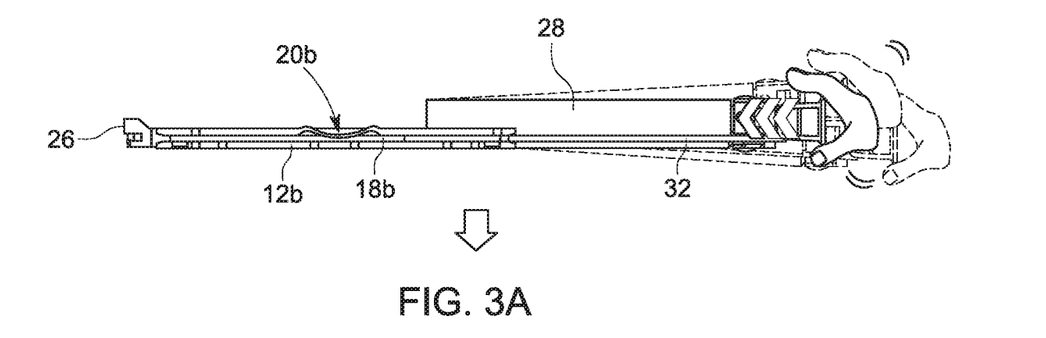
FIG. 3A illustrates a first position of a progressive movement of the electronics module of FIG. 2 as it slides into the pair of rails.

FIGS. 3A-3D illustrate the progressive movement of the electronics module 28 of FIG. 2 as it slides into the pair of rails 12a, 12b (only the rail 12b is shown in FIGS. 3A-3D) toward the system connector 26. As shown in FIG. 3A, the leading end of the guide portion 32 has entered the elongated guide slot 18b. In this position, the electronics module 28 has the potential for upward and downward movement (i.e., in the Z-direction shown in FIG. 1A) because the Z-direction dimension of the guide portion 32 is less than the Z-direction dimension of the elongated guide slot 18b.

Figure 3B:
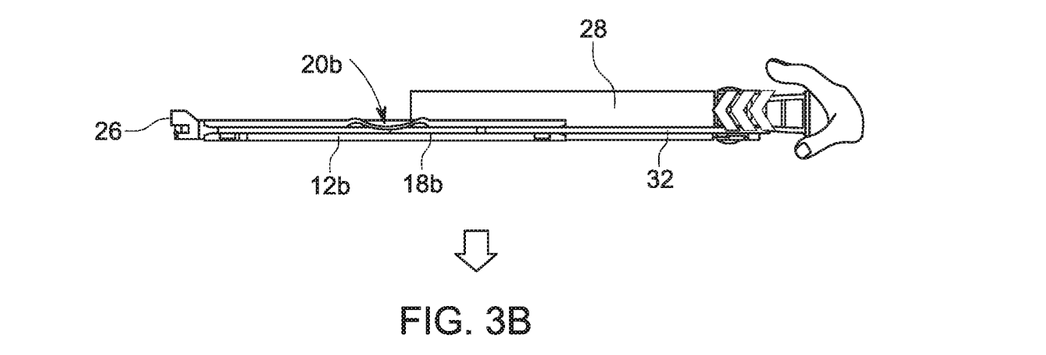
FIG. 3B illustrates a second position of the progressive movement of the electronics module of FIG. 2 as it slides into the pair of rails.
Figure 3C:
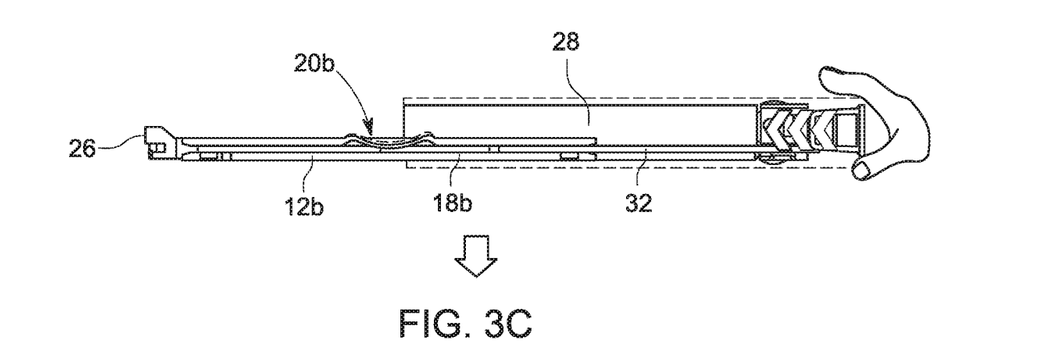
FIG. 3C illustrates a third position of the progressive movement of the electronics module of FIG. 2 as it slides into the pair of rails.
Figure 3D:
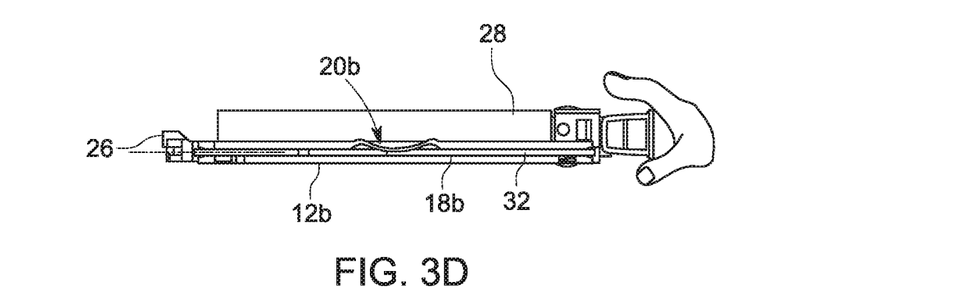
FIG. 3D illustrates a fourth position of the progressive movement of the electronics module of FIG. 2 as it slides into the pair of rails.

In FIG. 3B, the leading end of the guide portion 32 has moved to the position where it encounters the elastic structure 20b within the elongated guide slot 18b of the rail 12b. At this point, the leading edge of the guide portion 32 starts to become pinched between the elastic structure 20b and the lower wall defining the elongated guide slot 18b. As the leading end of the guide portion 32 slides past the elastic structure 20b (FIG. 3C), the guide portion 32 of the electronics module 28 is now firmly pinched between the elastic structure 20b and the lower wall defining the elongated guide slot 18b. The elastic structure 20b now limits the movement of the entire electronics module 28 such that it continues sliding toward the connector 26 with a minimal (or negligible) amount of movement in the Z-direction. Accordingly, the module connector 30 (FIG. 2) of the electronics module 28 is properly aligned for an accurate insertion into the system connector 28, as shown in FIG. 3D.

Figure 4:
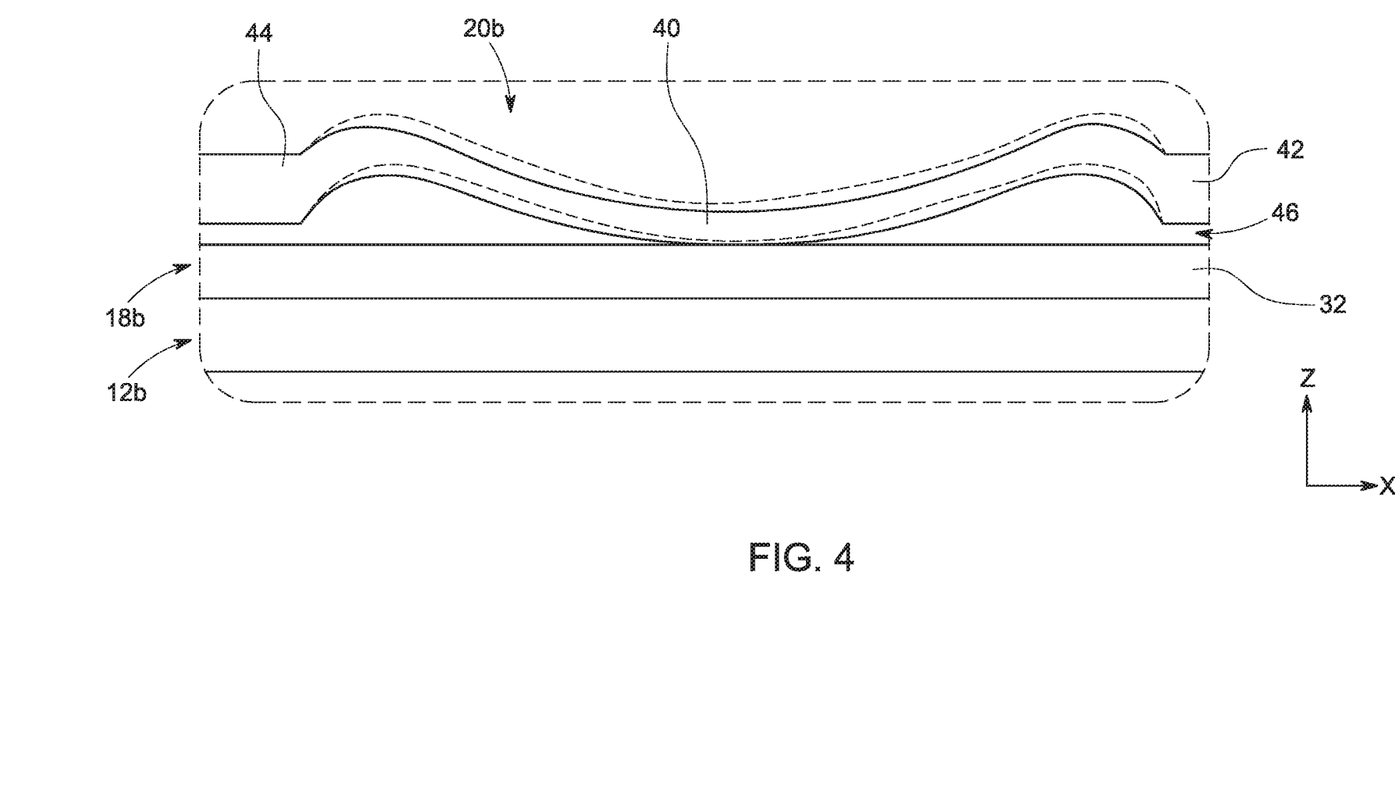
FIG. 4 illustrates an enlarged view of the elastic structure of the rail while engaging a portion of the electronics module.

FIG. 4 illustrates the details of the elastic structure 20b in its operable position, which limits the movement of the electronics module 28 (FIG. 2) in the Z-direction. The elastic structure 20b has a curved shape with an engagement portion 40 between two fixed ends 42, 44. The elastic structure 20b extends into an opening in the top wall that forms the elongated guide slot 18b. The engagement portion 40 engages the guide portion 32 and bends upwardly, creating a spring force that urges the guide portion 32 against the lower wall that forms the elongated guide slot 18b. However, a gap 46 is still maintained in front of and behind the elastic structure 20b. The upward movement of the engagement portion 40 is shown in dashed lines. Consequently, the elastic structure 20b changes from a first shape to a second shape in response to being moved to its operable position when engaging the guide portion 32 of the electronics module 28. When the electronics module 28 is removed from the docking system 10 by sliding movement in the opposite direction, the elastic structure 20b elastically returns back to its first shape.

In one preferred embodiment, the elastic structure 20b has a length dimension of about 25 mm between two fixed end regions 42, 44. Thus, the elastic structure 20b covers about 20% to 25% of the overall length "L" (FIG. 1B) of the rail 12b. The thickness and width of the elastic structure 20b between two fixed end regions 42, 44 are both about 1 mm. The upward movement of the engagement portion 40 to its operable position is about 0.2 mm. The dimensions and material of the elastic structure 20b can be altered to change the amount of spring force exerted on the guide portion 32 of the electronics module 28. In one embodiment, the elastic structures 20a, 20b provide a spring force of about 3 kg or less.

The elongated guide slot 18b has a Z-direction dimension of about 2 mm. The height of the guide portion 32 in the Z-direction is about 1.5 mm. Hence, the gap 46 has a dimension of about 0.5 mm when the engagement portion 40 is in its operable positon that forces the guide portion 32 downwardly against the lower wall of the elongated guide slot 18b. Thus, in its initial position, the elastic structure 20b extends into the elongated guide slot 18b to reduce the effective height of the elongated guide slot 18b adjacent to the elastic structure 20b to being less than the height of the guide portion 32.

The rails 12a, 12b are preferably made of a polymeric material. The elastic structures 20a, 20b may be integrally formed with the first and second rails 12a, 12b and may be made of the same material. Different sizes and shapes for the elastic structures 20a, 20b are within the scope of the present invention. For example, the elastic structures 20a, 20b may be fixed at only one end, as opposed to being fixed at both ends 42, 44. Furthermore, the present invention contemplates that the elastic structures 20a, 20b can be separate components that are attached to the rails 12a, 12b.

The pair of rails 12a, 12b having the elastic structures 20a, 20b provides several benefits over prior art systems. They allow the electronics module 28 to dock into the system connector 26 (shown in FIGS. 3A-3D) more accurately, leading to a lower risk of damage during installation of the electronics module 28. Furthermore, because the elastic structures 20a, 20b provide an additional retention force to the guide structures 32 after installation, there is less risk for damage from shock or vibration during operation or transportation to a different location. Lastly, a design in accordance with the present invention helps to absorb the overall assembly tolerances and the dimensional tolerances of the parts. For example, because the elastic structures 20a, 20b force the guide structures 32 against the lower wall of the guide slots 18a, 18b, the cumulate tolerance in the system to permit connection can be reduced. In one embodiment, the cumulative tolerance was reduced from 0.31 mm to 0.18 mm, which raises the accuracy of connection by 40%.

Figure 5:
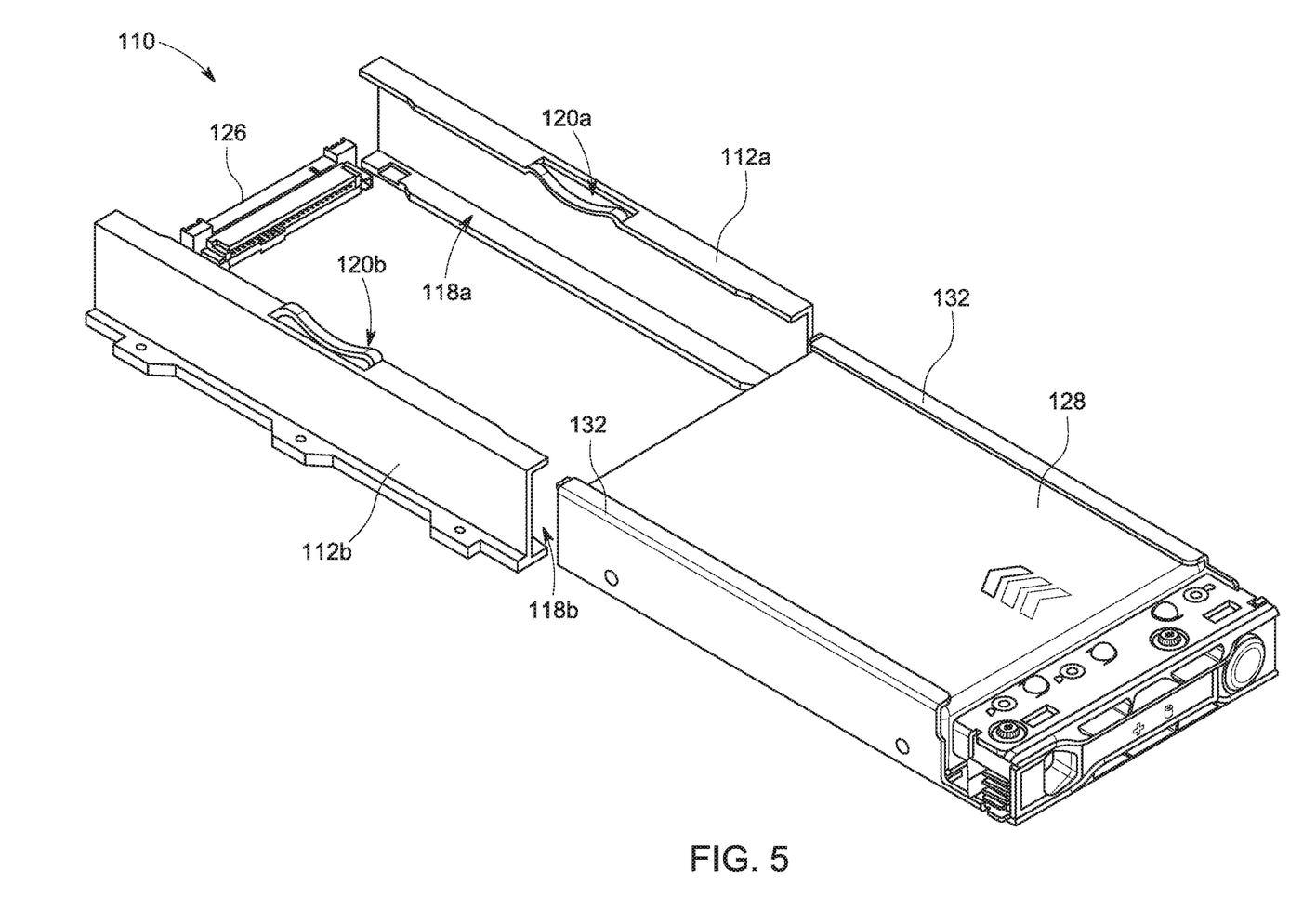
FIG. 5 illustrates an alternative pair of rails and a larger electronics module that is to be inserted into the rails.

FIG. 5 illustrates an alternative docking system 110 that includes a pair of rails 112a, 112b and a system connector 126 to mate with a thicker electronics module 128 (e.g., a 2.5" HDD module). Relative to the height "H" of the first and second rails 12a, 12b of the previous embodiment (see FIG. 1C), the first and second rails 112a have substantially larger heights. As such, the rails 112a, 112b define a pair of elongated guide slots 118a, 118b that are much larger to accommodate the thicker electronics module 128.

Unlike the prior embodiment of FIGS. 1A-4 that had laterally extending guide portions 32, the electronics module 128 utilizes guide portions 132 configured as part of the overall enclosure of the electronics module 128 to slide within the pair of elongated guide slots 118a, 118b. Guide portion surfaces on the underside of the electronics module 128 are not shown in FIG. 5. Like the prior embodiment, two elastic structures 120a, 120b within the pair of elongated guide slots 118a, 118b create a force to hold the electronics module 128 in proper alignment as it slides forward to mate with the connector 126. The two elastic structures 120a, 120b also provide a retention force to the electronics module 128 during operation and transportation.

The foregoing description of the embodiments, including illustrated embodiments, has been presented only for the purpose of illustration and description and is not intended to be exhaustive or limiting to the precise forms disclosed. Numerous modifications, adaptations, and uses thereof will be apparent to those skilled in the art.

Although the disclosed embodiments have been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

While various embodiments of the present invention have been described above, it should be understood that they have been presented by way of example only, and not limitation. Numerous changes to the disclosed embodiments can be made in accordance with the disclosure herein, without departing from the spirit or scope of the invention. Thus, the breadth and scope of the present invention should not be limited by any of the above described embodiments. Rather, the scope of the invention should be defined in accordance with the following claims and their equivalents.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

What is claimed is:

1. A docking system for facilitating a connection of an electronics module to a mating connector, the docking system comprising:
    first and second rails that are separated from and oppose each other, each of the first and second rails having an elongated guide slot, each of the elongated guide slots receiving a corresponding guide portion of the electronics module during a sliding movement of the electronics module toward the mating connector, each of the elongated guide slots of the first and second rails are U-shaped and defined by two opposing walls and a connecting wall between the two opposing walls;

a first elastic structure formed as part of one of the opposing walls of the first rail and separated from the connecting wall by a slot in the one of the opposing walls such that the first elastic structure has two first fixed ends and a first curved middle region between the two first fixed ends, the first elastic structure being a thin member such that the first curved middle region has first upper and lower curved surfaces that are curved downwardly toward the elongated guide slot to form a bow shape for the first elastic structure, the first lower curved surface defining a first engagement portion extending into the elongated guide slot of the first rail; and a second elastic structure formed as part of one of the opposing walls of the second rail and separated from the connecting wall by a slot in the one of the opposing walls such that the second elastic structure has two second fixed ends and a second curved middle region between the two second fixed ends, the second elastic structure being a thin member such that the second curved middle region has second upper and lower curved surfaces that are curved downwardly toward the elongated guide slot to form a bow shape for the second elastic structure, the second lower curved surface defining a second engagement portion extending into the elongated guide slot of the second rail;

wherein the first engagement portion of the first elastic structure and the second engagement portion of the second elastic structure are configured to engage the guide portions of the electronics module, the first engagement portion and the second engagement portion being further configured to urge the guide portions against the other ones of the two opposing walls of the guide slots and to resist movement of the guide portions in a direction generally perpendicular to the sliding movement of the electronics module.

2. The docking system of claim 1, wherein each of the elongated guide slots has an insertion end at which the electronics module is to be inserted, each of the elongated guide slots further having a terminal end adjacent to the mating connector, each of the first and second elastic structures being located along the elongated guide slots at a middle region between the insertion end and the terminal end.

3. The docking system of claim 1, wherein the first and second rails include fastening regions for permitting the first and second rails to be fixedly mounted to other structures, the first and second rails being fixedly mounted such that the distance between the first and second rails is approximately the width of the electronics module.

4. The docking system of claim 1, wherein a height of the elongated guide slots in regions outside the first and second elastic structures is greater than the height of the guide portions of the electronics module, the first and second elastic structures extending into the elongated guide slots, the extending of the first and second elastic structures reducing the height of the elongated guide slots at the first and second elastic structures to be less than the height of the guide portions.

5. The docking system of claim 4, wherein the first engagement portion of the first elastic structure and the second engagement portion of the second elastic structure are configured to engage the guide portions of the electronics module during insertion and during operation of the electronics module.

6. The docking system of claim 5, wherein the first and second elastic structures transition from a first shape to a second shape in response to the first and second engagement portions engaging the guide portions of the electronics module.

7. The docking system of claim 6, wherein the first and second elastic structures transition from the second shape to the first shape in response to the electronics module being removed from the first and second rails.

8. The docking system of claim 1, wherein the electronics module is one of the group consisting of an Open Compute Project (OCP) module and an HDD storage module.

9. The docking system of claim 1, wherein the first and second elongated guide slots receive laterally extending flanges of the electronics module, the laterally extending flanges being the guide portions.

10. The docking system of claim 1, wherein the first and second rails are made of a polymeric material, the first elastic structure being integrally formed with the first rail, the second elastic structure being integrally formed with the second rail.

11. The docking system of claim 1, wherein the electronics module includes a module connector, and the first and second elastic structures assist with aligning the module connector with the mating connector for making a mechanical and electrical connection.

12. A method of connecting an electronics module to a mating connector, the electronics module including first and second guide portions, the method comprising:

inserting the first guide portion of the electronics module into a first elongated guide slot associated with a first rail, the first elongated guide slot being U-shaped and defined by a first pair of opposing walls and a first connecting wall between the first pair of opposing walls;

inserting the second guide portion of the electronics module into a second elongated guide slot associated with a second rail, the second elongated guide slot being U-shaped and defined by a second pair of opposing walls and a second connecting wall between the second pair of opposing walls;

while the first guide portion of the electronics module is within the first elongated guide slot and the second guide portion of the electronics module is within the second elongated guide slot, moving the electronics module toward the mating connector; and while the electronics module is moving toward the mating connector, limiting movement of the electronics module in a direction generally perpendicular to the movement toward the mating connector, the movement being limited by engagement of the first guide portion with a first curved middle region of the first elastic structure associated with the first rail, and wherein the first elastic structure extends into the first guide slot from one wall of the first pair of opposing walls toward the other wall of the first pair of opposing walls, the first elastic structure being formed as part of one of the opposing walls of the first rail and being separated from the connecting wall by a slot in the one of the opposing walls such that the first elastic structure has two first fixed ends and the first curved middle region between the two first fixed ends, the first elastic structure being a thin member such that the first curved middle region has first upper and lower curved surfaces that are curved downwardly toward the elongated guide slot to form a bow shape for the first elastic structure.

13. The method of claim 12, further including a second elastic structure extending into the second guide slot from one wall of the second pair of opposing walls toward the other wall of the second pair of opposing walls, and wherein the limiting further includes engaging the second guide portion with the second elastic structure.

14. The method of claim 12, wherein the first elastic structure transitions from a first shape to a second shape during the engagement of the first guide portion with the first curved middle region of the first elastic structure.

15. The method of claim 12, further including, after the limiting, forming a mechanical and electrical connection between a module connector on the electronics module and the mating connector.

16. The method of claim 12, wherein the first and second rails are made of a polymeric material, the first elastic structure being integrally formed with the first rail.

* * * * *